June 20, 1967  C. E. FRICK  3,326,237
REPEATING PNEUMATIC TIMER
Filed April 12, 1965  2 Sheets-Sheet 1

INVENTOR
CHARLES E. FRICK
BY Maurice W. Ryan
ATTORNEY

June 20, 1967  C. E. FRICK  3,326,237
REPEATING PNEUMATIC TIMER

Filed April 12, 1965  2 Sheets-Sheet 2

INVENTOR
CHARLES E. FRICK
BY Maurice W. Ryan
ATTORNEY

United States Patent Office 3,326,237
Patented June 20, 1967

3,326,237
REPEATING PNEUMATIC TIMER
Charles E. Frick, South Charleston, W. Va., assignor to Union Carbide Corporation, a corporation of New York
Filed Apr. 12, 1965, Ser. No. 447,334
7 Claims. (Cl. 137—624.14)

The present invention relates to apparatus for the production of pneumatic signals such as control signals and more particularly to a novel self-contained device for the automatic production of a continual series of pneumatic output signals of selectable amplitude and frequency. Apparatus according to the present invention may be successfully applied as a repeating pneumatically operated timing mechanism to initiate the operation of relatively inaccessible equipment such as submerged sewage sampling pumps and untended devices in hazardous locations, the only power supply required being a small portable pneumatic pressure source.

Many areas of industry and many governmental bodies such as municipalities and the like presently utilize waste disposal plants and water treatment plants to suitably condition industrial waste, sewage and the like before these are returned to natural water bodies and also to treat plant and utility intake water such as boiler feed water, cooler water, drinking water and water for other uses. Industry in addition, particularly the chemical production industry, requires precise control of the concentration of constituents of interest in process streams. In general it may be stated that in a large percentage of cases where quality control of fluid substances of interest is required, the continuous or continual sampling which must be performed as an initial step in control procedures involves the extraction of samples from locations of difficult access or locations which are hazardous. It follows that sampling systems and the auxiliary devices which actuate them must operate for protracted periods of time untended by human apparatus and without any maintenance. The high degree of reliability necessary militates against the utilization of mechanically complex apparatus for such use and the relative hazards of electrical equipment in hazardous locations usually eliminates electrically operated apparatus from consideration. Ideally, most suitable equipment would be of a type which would require no attenton at all after initial installation. Realistically, the power consumption attendant the on-off operation of sampling pumps and the like and the power requirements of auxiliary devices has, to date, obviated the availability of such ideal devices.

The present invention however provides a significant advance in the art and has been found in several test installations to be exceptionally well suited as an automatic timing device to control the operation of deep sampling pumps in sewage treatment installations and other similar applications.

Accordingly, it is the major object of the present invention to provide a fully automatic pneumatic timing mechanism requiring only a self-contained pressure supply which can be attached to and immersed with a timing device itself. In place in such a location as a deep sewage sampling zone, the device furnishes a continual series of pneumatic output signals for the on-off control of sample extratcion pumps or the like.

It is a further object of this invention to provide a pneumatic control signal production device which is rugged, safe, simple in operating principle, having a minimal number of working parts and requiring minimum maintenance.

With the foregoing and other objects in view which will be comprehended more fully in the light of the ensuing disclosure, the invention will now be described in greater detail and with reference to the appended drawings wherein.

Figure 1:
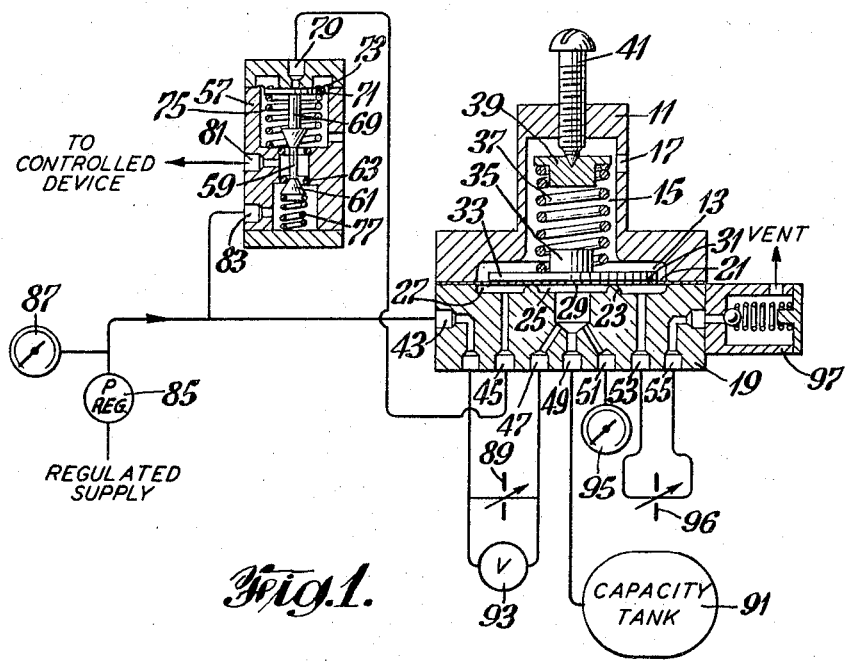
FIGURE 1 is a partially schematic and cross-sectional view of an embodiment of apparatus according to the present invention showing the mechanism at a time when no output signal is being produced.
Figure 2:
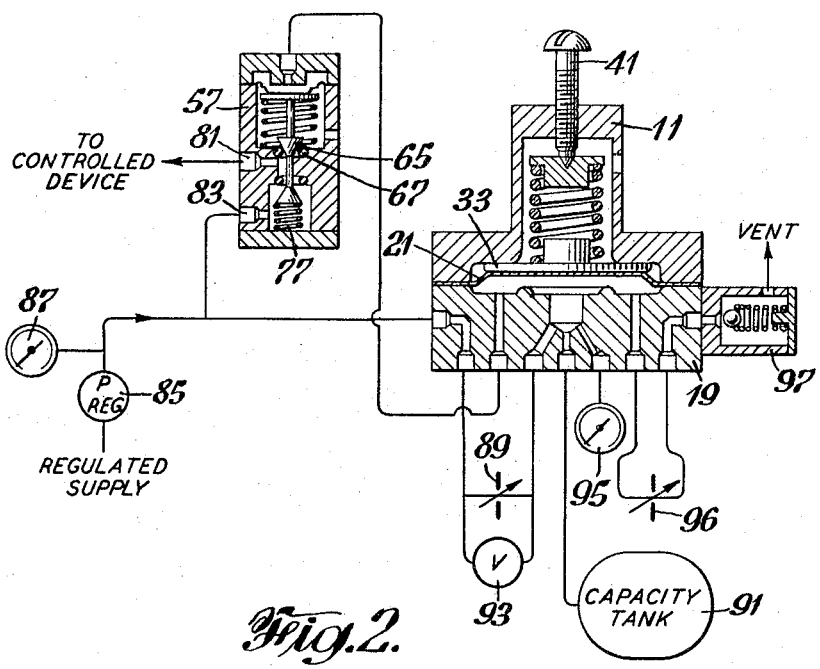
FIGURE 2 illustrates the apparatus of FIGURE 1 at a time when a pneumatic output signal is being produced and FIGURE 3 is a partially schematic and cross-sectional view of an alternative apparatus embodiment according to the present invention utilizing structural linkage to the servo control valve and showing the component parts in a "signal-off" condition.

Referring to FIGURE 1, apparatus according to the present invention comprises a first body portion 11 having a diaphragm chamber 13 and a spring chamber 15. A vent 17 is provided in a wall of first body portion 11 to connect the interior chambers with the environment exterior of the apparatus. A second body portion 19 is arranged in juxtaposition to first body portion 11 and the two body portions are sealably separated by a flexible diaphragm 21. The second body portion 19 is provided with a diaphragm seat 23 which divides a diaphragm chamber formed in second body portion 19 into two concentrically disposed spaces indicated as inner space 25 and outer space 27. A multiplicity of interior passages, the various purposes of which will be hereinafter described is also provided in the second body portion 19. One surface 29 of diaphragm 21 is shown seated on diaphragm seat 23 in FIGURE 1, effecting closure between the inner space 25 and the outer space 27. The other surface 31 of diaphragm 21 is in contiguous contact with a diaphragm backing plate 33 provided with a centering stud 35. The coil spring 37 fitted over the centering stud 35 applies a resilient force against the backing plate and diaphragm to maintain the closure between spaces 25–27. A spring follower 39 is provided in spring 37 at the end opposite the centering stud end and an adjusting screw 41 threaded through the top of first body portion 11 permits the selectable adjustment of compressive loading desired in the spring. The several interior passages in second body portion 19 are designated 43, 45, 47, 49, 51, 53, and 55 reading from left to right in the drawing. A servo control valve 57 is shown separately for schematic clarity but may actually be incorporated in one or the other of the body portions of the apparatus. Control valve 57 comprises a valve stem 59 reciprocally movable between two positions. In the position illustrated in FIGURE 1, a valve seat 61 on stem 59 seats on a valve seal 63. In the position illustrated in FIGURE 2 a valve seat 65 on stem 59 seats on a valve seal 67 and the space between seat 61 and seal 63 is open to permit flow therethrough. Valve stem 59 is connected longitudinally through an extension 69 and a disc 71 to a small bellows type flexible diaphragm 73. A spring 75 is provided between disc 71 and a shoulder interior of the control valve 57 to exert sufficient compression to maintain closure between valve seat 61 and seal 63 when the apparatus is in the "off" position. An auxiliary spring 77 to implement this purpose is provided in the control valve 57 extending between valve stem 61 and an end closure of the valve. The body of control valve 57 is also provided with passages 79, 81, and 83, the purpose of which will be explained hereinafter. The remaining component parts of the apparatus can be best explained in the following description of the operation of the device.

Referring to FIGURE 1, the control valve 57 is shown in the closed position. A supply source of air or other gas not shown is regulated for constant pressure by a regulator 85. A pressure gauge 87 may be provided at this point in the system for monitoring the regulated pressure supply. The regulated supply pressure source connects to passage 43 in the second body portion and to passage 83 in control valve 57. Alternatively, or as conditions require, a separate regulated supply source may be provided to the passage 83 of valve 57, as shown in the embodiment illustrated in FIGURE 3. At the start of an operating cycle gas from the regulated supply flows through passage 43, through a variable flow restrictor 89, on through passage 47 to fill inner space 25 and further through passage 49 into a capacity tank 91. A testing by-pass valve 93 may be provided in parallel flow relationship with variable restrictor 89 to provide for quick-testing of the functioning of the apparatus. Valve 93 however is closed while the timer is in normal operation. The pressure in interior space 25 may be monitored by a gauge 95 connected to passage 51 which connects interiorly with the inner space 25. As the flow from the regulated source fills the passages and capacity tank 91, pressure increases at the undersurface 29 of diaphragm 21 inside space 25.

When the pressure is sufficient to overcome the force exerted by spring 37, the diaphragm begins to rise, permitting gas to pass over diaphragm seat 23 into the outer space 27. When the force exerted by spring 37 has been overcome sufficiently to raise the diaphragm 21 from seat 23, a much larger diaphragm underside area is available to the actuating gas medium. Even though there is some slight pressure drop as the gas flows into the outer space 27, the total force applied to the entire underside of the diaphragm will be sufficient to maintain the diaphragm raised from its seat. Thus immediately upon flow of gas from inner space 25 to outer space 27, the force in opposition to spring 37 increases rapidly and permits a cumulatively increasing flow and increasing total force which completely opens diaphragm 21 from seat 23 to the condition shown in FIGURE 2 of the drawings. Source gas thereupon fills outer space 27 and connecting passage 53, flows through a second variable restrictor 96, through passage 55 and impinges of the spring loaded ball of a back pressure valve 97.

At this point of time in the operating cycle, equalized pressure obtains in the entire zone bounded by the undersurface 29 of diaphragm 21, including capacity tank 91 and at back pressure valve 97. Pressure obtaining in this zone also impinges now on the bellows diaphragm 73 of control valve 57 through passage 45 connecting from outer space 27 and through control valve inlet passage 79. When the increasing pressure attains a preselected value, the force of the control valve springs 75, 77 is overcome and the moving components of the control valve assume the position illustrated in FIGURE 2, permitting a pneumatic signal to pass from the pressure supply source (or, alternatively, from a separate source) through control valve passage 83, the now opened space between seat 61 and seal 63 and on to a controlled device through servo control valve signal air outlet passage 81. At a pressure less than the pressure which initially raises diapharagm 21 from seat 23, the force exerted by the spring in the back pressure valve 97 is overcome, unseating the back pressure valve ball and venting the source gas to the environment in which the apparatus resides. This causes a pressure drop in the entire zone bounded by the undersurface 29 of the diaphrgam 21, permitting return of all moving parts in the apparatus to the condition shown in FIGURE 1 of the drawings for the next operating cycle. In this connection it should be noted that the second variable flow restrictor 96 has a preselected flow rate higher than the first variable flow restrictor 89, thus permitting a continuous pressure decrease, after back pressure valve 97 opens, to a pressure at which diaphragm 21 reseats on diaphragm seat 23 and back pressure valve 97 closes. Back pressure valve 97 is set to close at a pressure slightly less than that required to hold diaphragm 21 off seat 23 with pressure impinging upon the entire undersurface 29 of diaphragm 21. The venting time and the time duration of the output signal at passage 81 for any particular apparatus arrangement are determined by the relative flow rates through the two restrictors 89, 96 and the volume of the capacity tank 91. The servo valve open time is also influenced by the resilient force of springs 75-77 opposing the fluid pressure impinging on the bellows diaphragm 73. The open time of the servo valve can be varied by adjusting these mechanical components to utilize any desired portion of the signal pulse. The signal pulse is basically saw-toothed with a decreasing tailing slope and spring force in the servo valve can be set or adjusted to close the valve at any desired point on this slope. When the force exerted by spring 37 has been overcome sufficiently to raise the diaphragm 21 from seat 23 a much larger diaphragm area is available to the actuating gas medium and a lower pressure (but greater total force) than the pressure at time of initial gas leakage over seat 23 will be able to hold the diaphragm and its backing plate 33 against the built-in stop provided by the shoulder defined in first body portion 11 at the junction of chambers 13 and 15, thus permitting the capacity tank 91 and the rest of the zone to vent through back pressure valve 97 to a lower pressure than the initial leakage pressure over the seat 23. As the venting continues through the restrictor 96, a point in time is reached when the spring 37 pressure overcomes force exerted by the remaining gas under the total area of diaphragm 21, and the diaphragm reseats on seat 23 closing the flow path between the inner space 25 and the outer space 27. Alternatively, the function of diaphragm 21 seating on seat 23 may be performed equally as well by providing a protruding extension from the undersurface 29 of the diaphragm and seating such extension against a flat surface in the diaphragm chamber in the second body portion of the apparatus. In this respect, the term "diaphragm seat" is also intended to mean any surface or portion of a surface in the diaphragm chamber portion in the second body portion of the apparatus upon which the diaphragm 21 seats to effect sealable separation between the spaces 25 and 27.

Figure 3:
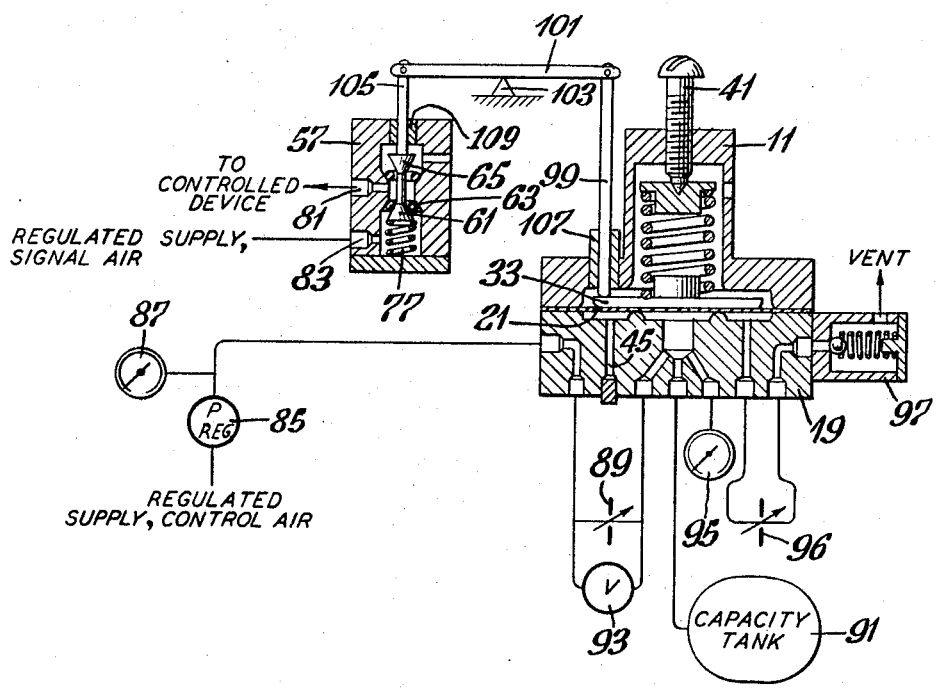

In the alternative embodiment shown in FIGURE 3, passage 45 is plugged and a mechanical lingage comprising a first actuating rod 99, a lever 101, fulcrum 103 and a second actuating rod 105 is arranged between the main portion of the apparatus and the servo control valve 57. Rod 99 extends at one end through a bushing 107 fitted into an opening in first body portion 11 of the apparatus and bears upon the diaphragm backing plate 33. Rod 105 extends at one end through a bushing 109 fitted into an opening in one end of control valve 57 and bears upon valve seat 65. Spring 77 in the control valve maintains the bearing relationship at the respective rod ends. Lever 101 is pin-connected to the rods as shown. The operation is as described hereinabove except that as the diaphragm 21 and its backing plate 33 raise from the diaphragm seat, the backing plate pushes rod 99 upward; according to the orientation shown in FIGURE 3, pivoting the lever 101 and pushing rod 105 downward to unseat the control valve seat 61 from seal 63 and permit the flow of signal air in through passage 83 and out through passage 81. The duration of each output signal pulse in this alternative embodiment depends solely on the frequency of the control signal applied by the mechanical linkage arrangement to the servo valve portion of the apparatus.

The invention is thus seen to comprise a diaphragm type pressure relief valve utilizing a capacity tank, restrictors and a differential area diaphragm lift to provide a selectable difference between opening and reseating pressures during continuous operation. The operating time can be adjusted by variations in the volume of the capacity tank and the relative flow rates of the two restrictors. The rating of the back pressure valve and the resiliency of the spring components are selected in accordance with the pressure of the regulated supply. In the light of my disclosure, persons skilled in the mechanical arts can readily design and construct apparatus according to the present invention to suit any application need.

From the foregoing description persons familiar with the art will undoubtedly project numerous alternative embodiments which will fall properly within the scope of this invention. The description is therefore considered illustrative only and should not be construed in any limiting sense, it being intended to limit the invention according to the appended claims.

What is claimed is:

1. Apparatus for the production of a continual series of fluid output signals of selectable amplitude and frequency comprising, in combination, a first body section having a portion of a diaphragm chamber, a spring chamber connecting to said portion of said diaphragm chamber and a vent connecting the spring chamber to exterior the apparatus; a second body section having a multiplicity of passages, another portion of said diaphragm chamber, and a diaphragm seat which divides said last recited chamber portion into two spaces; a diaphragm arranged between said first body portion and said second body portion flexibly movable between a first position in contact with said diaphragm seat to sealably separate said two spaces, and a second position out of contact with said diaphragm seat; a regulatable pressure supply source of a fluid medium; a back pressure valve having an outlet to exterior of the apparatus and an inlet; first adjustable flow restrictor means between a first passage connecting from said supply source and a second passage connecting to one of said two spaces in that portion of the diaphragm chamber in said second body section; capacity tank means connecting to the first recited one of said two spaces through a third passage; second adjustable flow restrictor means between a fourth passage connecting from the other of said two concentrically disposed spaces and a fifth passage connecting to said back pressure valve inlet, said second adjustable flow restrictor means having a higher flow rate than that of said first adjustable flow restrictor means; a fluid output signal control valve having an inlet connected to a regulatable pressure supply source of a fluid medium, operable to produce a fluid output signal upon receiving a control signal when said diaphragm is in said second position, and means connecting from the location of said diaphragm to said fluid output signal control valve to transmit a control signal according to the position of said diaphragm as said diaphragm moves from said first position to said second position.

2. Apparatus according to claim 1 wherein the first recited supply source of fluid medium and the supply source of fluid medium connected to the fluid output signal control valve inlet are comprised in a single fluid medium supply source.

3. Apparatus for the production of a continual series of fluid output signals of selectable amplitude and frequency comprising, in combination, a first body section having a portion of a diaphragm chamber, a spring chamber connecting to said portion of said diaphragm chamber and a vent connecting the spring chamber to exterior the apparatus; a second body section having a multiplicity of passages, another portion of said diaphragm chamber, and a diaphragm seat which divides said last recited chamber portion into two concentrically disposed spaces; a diaphragm arranged between said first body portion and said second body portion flexibly movable between a first position in contact with said diaphragm seat to sealably separate said two concentrically disposed spaces, and a second position out of contact with said diaphragm seat; a regulatable pressure supply source of a fluid medium; a back pressure valve having an outlet to exterior of the apparatus and an inlet; first adjustable flow restrictor means between a first passage connecting from said supply source and a second passage connecting to one of said two concentrically disposed spaces in that portion of the diaphragm chamber in said second body section; capacity tank means connecting to the first recited one of said two concentrically disposed spaces through a third passage; second adjustable flow restrictor means between a fourth passage connecting the other of said two concentrically disposed spaces and a fifth passage connecting to said back pressure valve inlet, said second adjustable flow restrictor means having a higher flow rate than that of said first adjustable flow restrictor means; a fluid output signal control valve having an inlet connected to a regulatable pressure supply source of a fluid medium, operable to produce a fluid output signal upon receiving a control signal when said diaphragm is in said second position; and means connecting from the location of said diaphragm to said fluid output signal control valve to transmit a control signal according to the position of said diaphragm as said diaphragm moves from said first position to said second position.

4. Apparatus according to claim 3 wherein the first recited supply source of fluid medium and the supply source of fluid medium connected to the fluid output signal control valve inlet are comprised in a single fluid medium supply source.

5. Apparatus for the production of a continual series of fluid output signals of selectable amplitude and frequency comprising, in combination, a first body section having a portion of a diaphragm chamber, a spring chamber connecting to said portion of said diaphragm chamber and a vent connecting the spring chamber to exterior the apparatus; a second body section having a multiplicity of passages, another portion of said diaphragm chamber, and a diaphragm seat which divides said last recited chamber portion into two concentrically disposed spaces; a diaphragm arranged between said first body portion and said second body portion flexibly movable between a first position in contact with said diaphragm seat to sealably separate said two concentrically disposed spaces, and a second position out of contact with said diaphragm seat; a regulatable pressure supply source of a fluid medium; a back pressure valve having an outlet to exterior of the apparatus and an inlet; first adjustable flow restrictor means between a first passage connecting said supply source and a second passage connecting to one of said two concentrically disposed spaces in that portion of the diaphragm chamber in said second body section; capacity tank means connecting to the first recited one of said two concentrically disposed spaces through a third passage; second adjustable flow restrictor means between a fourth passage connecting the other of said two concentrically disposed spaces and a fifth passage connecting to said back pressure valve inlet, said second adjustable flow restrictor means having a higher flow rate than that of said first adjustable flow restrictor means; a fluid output signal servo control valve having an inlet connected to a regulatable pressure supply source of a fluid medium, operable to produce a fluid output signal upon receiving a fluid servo control signal when said diaphragm is in said second position; and sixth passage means connecting from said other of said two concentrically disposed spaces to operating means in said servo control valve whereby said servo control signal is transmitted.

6. Apparatus according to claim 5 wherein the first recited supply source of fluid medium and the supply source of fluid medium connected to the fluid output signal control valve inlet are comprised in a single fluid medium supply source.

7. Apparatus for the production of a continual series of pneumatic output signals of selectable amplitude and frequency comprising, in combination, a first body section having a portion of a diaphragm chamber, a spring chamber connecting to said portion of said diaphragm chamber and a vent connecting the spring chamber to exterior the apparatus; a second body section having a multiplicity of passages, another portion of said diaphragm chamber, and a diaphragm seat which divides said last recited chamber portion into concentrically disposed inner and outer spaces; a diaphragm arranged between said first body portion and said second body portion flexibly movable between a first position in contact with said diaphragm seat to sealably separate said two concentrically disposed inner and outer spaces, and a second position out of contact with said diaphragm seat; a regulatable pneumatic pressure supply source; a back pressure valve having an outlet to exterior of the apparatus and an inlet; first adjustable flow restrictor means between a first passage connecting said supply source and a second passage connecting to the inner of said two concentrically disposed spaces; a capacity tank connecting to said inner space through a third of said multiplicity of passages; second adjustable flow restrictor means between a fourth passage connecting from the outer of said two concentrically disposed spaces and a fifth passage connecting to said back pressure valve inlet, said second adjustable flow restrictor means having a higher flow rate than that of said first adjustable flow restrictor means; a pneumatic output signal servo control valve having an inlet connected to said regulatable pneumatic pressure supply source, operable to produce a pneumatic output signal upon receiving a pneumatic servo control signal when said diaphragm is in said second position; and sixth passage means connecting from the outer of said two concentrically disposed spaces to operating means in said servo control valve whereby said pneumatic servo control signal is transmitted.

References Cited

UNITED STATES PATENTS

| | | | |
|---|---|---|---|
| 2,345,380 | 3/1944 | Kirk | 137—624.14 X |
| 2,619,073 | 11/1952 | Brooks | 91—38 |
| 2,760,511 | 8/1956 | Greeff | 137—624.14 X |
| 3,016,840 | 1/1962 | Frick | 103—150 X |
| 3,209,748 | 10/1965 | Thomas | 137—624.14 X |

ALAN COHAN, *Primary Examiner.*